Jan. 24, 1950     M. E. RYAN     2,495,603
AUTOMATICALLY CONTROLLED ELECTRIC PRESSURE COOKER
Filed June 30, 1947     2 Sheets-Sheet 1

*INVENTOR.*
MARION E. RYAN
BY
Whittemore, Hulbert
& Belknap ATTORNEYS

Jan. 24, 1950 M. E. RYAN 2,495,603
AUTOMATICALLY CONTROLLED ELECTRIC PRESSURE COOKER
Filed June 30, 1947 2 Sheets-Sheet 2

INVENTOR.
MARION E. RYAN
BY
Whittemore, Hulbert
& Belknap ATTORNEYS

Patented Jan. 24, 1950

2,495,603

UNITED STATES PATENT OFFICE 2,495,603

AUTOMATICALLY CONTROLLED ELECTRIC PRESSURE COOKER

Marlon E. Ryan, Dearborn, Mich., assignor, by mesne assignments, to The Swartzbaugh Manufacturing Company, Toledo, Ohio, a corporation of Ohio Application June 30, 1947, Serial No. 758,080

2 Claims. (Cl. 219—43)

The present invention relates to an automatically controlled electric pressure cooker and more particularly to one in which pressure-responsive means interconnect the vessel of the pressure cooker and the electric heating element.

According to the present invention a pressure cooker combination comprising a pressure cooking vessel and an electrically heating base or stand therefor are provided. The base includes a pressure-responsive switch which is adapted to interrupt the circuit to the heating element upon attainment of a predetermined pressure within the vessel. A detachable conduit is provided between the pressure-responsive element in the base and a nipple carried by a side wall of the vessel. This conduit includes a quick detachable connection with the nipple whereby it may be disconnected from the vessel, and a support for the free end thereof is provided on the base. As a result, the base may be employed as an ordinary electric hot plate when not used in conjunction with the pressure cooking vessel.

The heating element carried by the base has a low heat capacity and is further associated with the base in such manner that upon interruption of the circuit to the heating element, there will not be any substantial heat transfer to the contents of the vessel thereafter.

With the foregoing general remarks in mind, it is an object of the present invention to provide a pressure cooker combination including a pressure cooking vessel and an electric heating base including detachable conduit means for interconnecting the interior of the vessel with a pressure-responsive switch controlling the current flow to the electric heating element.

It is a further object of the present invention to provide an electrically heating base for a pressure cooker including a conduit for connection to the interior of the pressure cooking vessel, the conduit being quickly detachable from the vessel and having means to support it in inoperative position below the top of the base.

It is a further object of the present invention to provide an electrically heating base for a pressure cooker characterized by the low heat capacity of the heating elements thereof.

It is a further object of the present invention to provide an electrically heating base for a pressure cooker characterized by the fact that upon interruption of current flow to the heating element, no substantial transfer of heat to the interior of the cooking vessel will thereafter take place.

Other objects and features of the invention will become apparent as the description proceeds, especially when considered in conjunction with the accompanying drawings, wherein.

Figure 1:
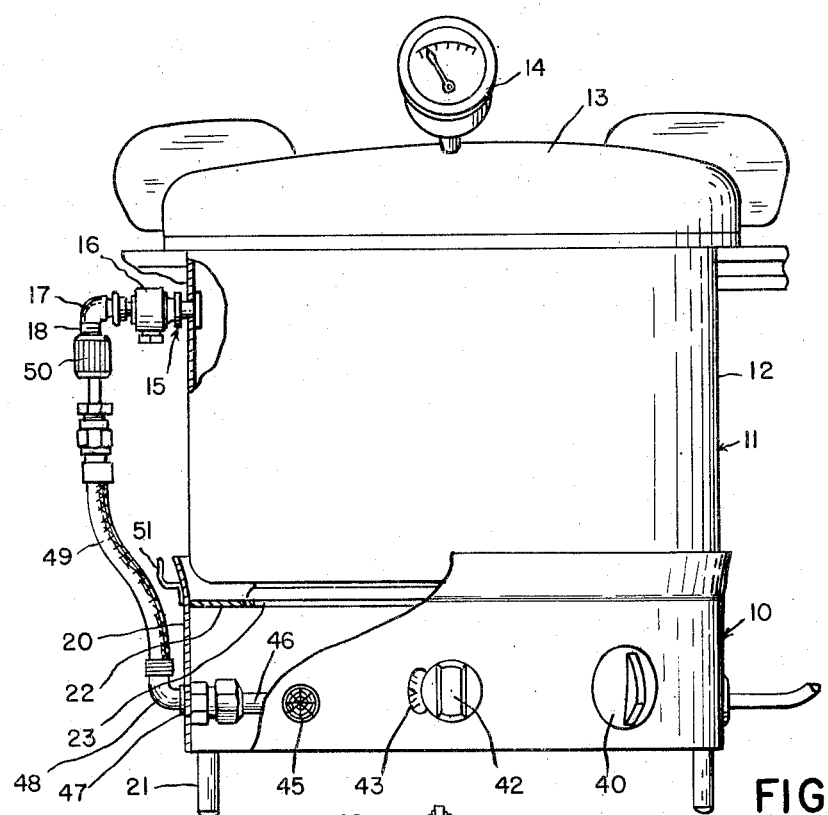
Figure 1 is a front elevation of the combined electric pressure cooker, with parts broken away.

The pressure cooker combination comprises essentially an electric heating base 10 and a pressure cooking vessel 11. The vessel 11 is of usual type having a lower container portion 12 and a removable cover 13 which is adapted to be engaged on the container 12 in sealing relation so that as heat is applied to the contents of the vessel pressure in the vessel builds up to a desired degree. Carried by the removable cover 13 is a pressure gauge 14 which gives a direct reading of the pressure in the interior of the vessel, and the device is equipped with the conventional pressure release or safety device (not shown).

Extending outwardly from a side wall of the container 12 is a nipple 15 which carries a valve 16 and an elbow 17. The elbow 17 includes a downwardly extending portion 18, which may be threaded as illustrated in Figure 1 or which may be provided with any other desired type of construction for affording a quick detachable connection with a connecting element.

Figure 2:
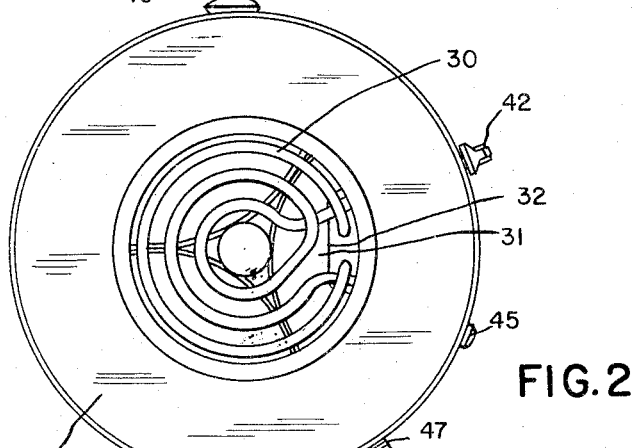
Figure 2 is a plan view of the base of the pressure cooker combination.
Figure 3:
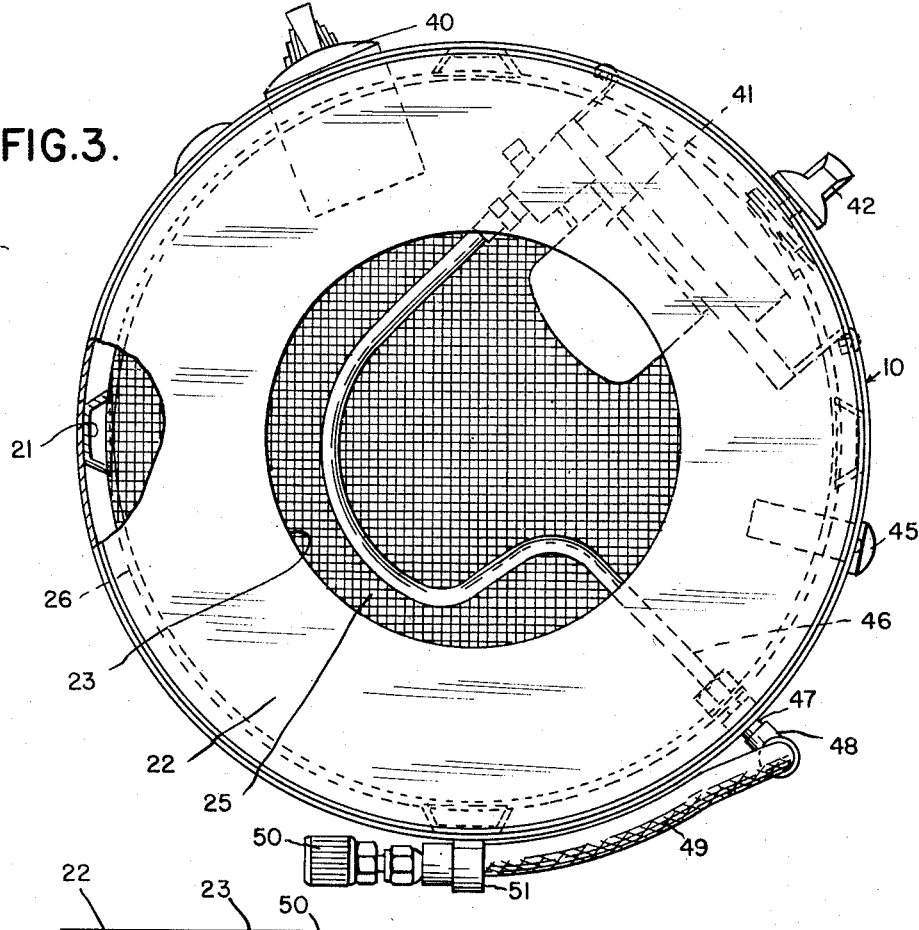
Figure 3 is a plan view of the base similar to Figure 2 on an enlarged scale and with the heating element omitted and with parts broken away.
Figure 4:
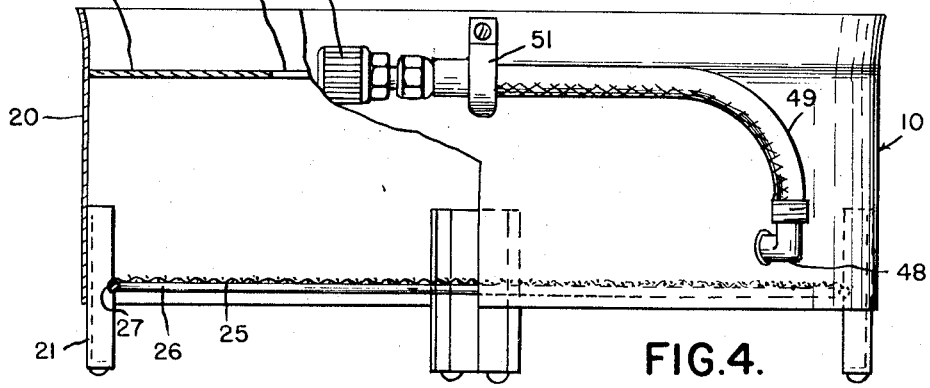
Figure 4 is a side elevation of the base, with parts broken away.

The base 10 includes a generally cylindrical side wall 20, a plurality of supporting legs 21 and a top closure plate 22 provided with a central opening 23. The bottom of the base 10 is closed by a screen 25 supported on a ring 26 which is seated in recesses 27 provided in the legs 21. As best seen in Figure 2, the central opening provided in the plate 22 supports an electric heating element 30 which is herein disclosed as comprising a pair of curved electric heating resistance elements. The heating element 30 is provided as a structure which includes a lower plate 31 having an opening 32 therein through which the ends of the resistance heating elements extend. The opening 32 in addition serves as a passage for air, and the side walls 20 of the base form a chimney which facilitates the upward flow of air by convection. This air may pass through the opening 32, over or across the heating elements and escape laterally from the top of the base. This convection flow of air tends to cool the heating elements when the current flow of these elements is interrupted and assists in preventing over-ride of pressure within the vessel 11.

In addition to the foregoing construction, which tends to prevent transfer of heat to the interior of the vessel after the circuit to the heating elements has been interrupted, the heating elements themselves are preferably of a light open construction and thus tend to cool quickly upon interruption of current flow thereto.

In pressure cookers, research has developed the fact that pressure control is very important and the attained pressure must be kept within close limits, beyond which food loss, spoilage, loss of vitamins, color and flavor occur.

Previously known pressure cookers lacking automatic control may introduce serious hazards resulting from incorrect processing of the foods. As a result of extensive research there are time-pressure data available for all foodstuffs or classes of foodstuffs. These data present the minimum safe time-pressure values which at the same time are optimum values. If pressures are held within close limits (as for example ± 1.5 pounds per square inch) then exact processing time specified may be used which insures both safety (sterilization) and products of proper food value, taste and color. If the pressure is not under accurate control and is allowed to fluctuate it becomes impossible to accurately follow the requirements and the food may be under or over processed.

In order to attain the automatic control alluded to above, the base 10 is provided with a switch 40 which may if desired be a 3-way switch for energizing either or both of the two separate heating elements shown. Connected in series with the switch 40 is a pressure-responsive switch, indicated generally at 41, which includes a finger piece 42 and a scale 43 graduated in terms of the expected pressures within the pressure cooking vessel. The pressure-responsive device 41 may be of a standard type available on the market and accordingly its construction is not illustrated or described in detail. Also parallel with the heating element previously described is a pilot light 45 which indicates whether or not current is flowing to the heating element. Located within the base 10 is a conduit 46 which interconnects the pressure-responsive switch 41 to a nipple 47 terminating in an elbow 48 having means for connection to a flexible conduit 49. The conduit 49 is provided at its free end with a quick detachable connector 50 suitably formed to cooperate with the depending portion 18 of the elbow 17, as previously described.

At the side of the base 10 is provided a spring clip 51 into which the free end of the conduit 49 may be engaged and supported when the same is disconnected from the nipple 15.

Inasmuch as the pressure-responsive switch 41 is of a type which is adapted to interrupt a circuit upon attainment of a predetermined pressure above atmospheric pressure, and since this pressure-responsive switch will therefore maintain the circuit closed at all times when the conduit 49 is disconnected from the vessel 11, the base 10 may be employed as a conventional hot plate if desired. This substantially increases its utility, as will be readily apparent.

The operation of the combined electrically heated hot plate is believed apparent from the foregoing description but will be briefly reviewed. In the ordinary food processing operation the food is placed in the vessel 11 and the cover 13 is secured thereon in sealed relation. The conduit 49 is connected by means of its connecter portion 50 with the nipple 15 and the valve 16 is opened to afford communication between the interior of the vessel and the pressure-responsive switch 41. By reference to data available, the pressure-responsive switch 41 is set to interrupt the circuit to the heating element upon attainment of a predetermined pressure. Thereafter the manual switch 40 is turned to energize either one or both of the electric resistance heating elements. These elements transfer heat to the interior of the vessel 11 causing an increase in pressure therein, which pressure builds up until the predetermined pressure is attained. Thereupon, the pressure-responsive switch 41 interrupts the circuit. Due to the fact that the heating elements are of low heat capacity and due also in part to the fact that a convection flow of air is provided past the heating elements, there will be little or no increase in pressure within the vessel 11 after the pressure-responsive switch 41 has interrupted current flow to the heating elements. As soon as the pressure within the vessel 11 falls below the predetermined or pre-set pressure, the pressure-responsive switch 41 again closes and this sequence of steps is repeated until the contents of the vessel have been subjected to the predetermined pressure for the requisite time.

It is normally desirable to reduce the pressure within the vessel quickly after the predetermined processing has been completed. In order to accomplish this the valve 16 is closed, and the quick detachable connection 50 is disconnected from the nipple 15. Thereafter the vessel 11 may be removed from the base 10 and when required in the process, cooled, as by running cold water over it or the like.

When the flexible conduit 49 has been disconnected from the nipple 15 its free end may be engaged in the clip 51 and thereby supported below the top of the base 10, at which time the base 10 may be employed as a conventional hot plate as previously described.

The present device is easily portable, may be operated from any convenient outlet and can be used on any work surface. It is easy to operate, safe to use, economical and easily serviced. More important, since it assures accurate maintenance of pressure within close limits it provides for the most efficient food processing operation without the necessity of close supervision, and therefore has the additional advantage of time saving.

While the foregoing specific embodiment has been illustrated and described as employing a pressure-responsive control, it will be apparent that if desired a temperature-responsive control responsive to the temperature of the contents of the pressure cooker vessel could be substituted. Since the pressure and temperature bear a definite relationship to each other, a control responsive to either pressure or temperature will be effective to control both temperature and pressure.

The drawings and the foregoing specification constitute a description of the improved automatically controlled electric pressure cooker in such full, clear, concise and exact terms as to enable any person skilled in the art to practice the invention, the scope of which is indicated by the appended claims.

What I claim as my invention is:

1. An electrically heated pressure cooker set adapted to control cooking pressure closely at different predetermined levels, a base comprising a vertical chimney-like wall and having an open top and bottom, a low heat capacity electric heating element at the top of said base, a pressure responsive switch in said base for controlling current flow to said element, means for adjusting the pressure at which said switch operates including an adjusting button at the side of said base, a pressure cooker vessel for use on said base, said base and vessel being shaped to provide for a convection flow of air through said base, past said heating element, and upwardly around the edges of the bottom of said vessel, a rigid nipple extending laterally from a side of said vessel, a valve in said nipple, a flexible conduit secured at one end to said base, a connection in said base between said flexible conduit and said pressure responsive switch, and quick releasable means at the free ends of said nipple and said flexible conduit for connecting said ends together.

2. An electrically heated pressure cooker set adapted to control cooking pressure closely at different predetermined levels, a base comprising a vertical chimney-like wall and having an open top and bottom, a low heat capacity electric heating element at the top of said base, a pressure responsive switch in said base for controlling current flow to said element, means for adjusting the pressure at which said switch operates including an adjusting button at the side of said base, a pressure cooker vessel for use on said base, said base and vessel being shaped to provide for a convection flow of air through said base, past said heating element, and upwardly around the edges of the bottom of said vessel, a rigid nipple extending laterally from a side of said vessel, a valve in said nipple, a flexible conduit secured at one end to said base, and extending laterally from one side thereof below the top of said base, a connection in said base between said flexible conduit and said pressure responsive switch, and quick releasable means at the free ends of said nipple and said flexible conduit for connecting said ends together.

MARION E. RYAN.

REFERENCES CITED

The following references are of record in the file of this patent:

UNITED STATES PATENTS

| Number | Name | Date |
|---|---|---|
| 1,931,190 | Goughnour | Oct. 17, 1933 |
| 2,097,825 | Wolcott | Nov. 2, 1937 |
| 2,194,117 | Graham | Mar. 19, 1940 |
| 2,369,932 | Allen | Feb. 20, 1945 |
| 2,392,077 | Wilson | Jan. 1, 1946 |
| 2,413,478 | Wiegand | Dec. 31, 1946 |